US010305602B2

United States Patent
Dolgin et al.

(10) Patent No.: US 10,305,602 B2
(45) Date of Patent: May 28, 2019

(54) DEMODULATION OF QAM MODULATED OPTICAL BEAM USING FABRY-PEROT ETALONS AND MICRORING DEMODULATORS

(71) Applicant: RAYTHEON COMPANY, Waltham, MA (US)

(72) Inventors: Benjamin P. Dolgin, Alexandria, VA (US); Andrew Kowalevicz, Arlington, VA (US); Gary M. Graceffo, Burke, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/816,047

(22) Filed: Nov. 17, 2017

(65) Prior Publication Data

US 2018/0145764 A1 May 24, 2018

Related U.S. Application Data

(60) Provisional application No. 62/424,084, filed on Nov. 18, 2016.

(51) Int. Cl.

| | |
|---|---|
| H04B 10/61 | (2013.01) |
| G02B 6/293 | (2006.01) |
| H04B 10/67 | (2013.01) |
| H04B 10/516 | (2013.01) |
| G02B 17/00 | (2006.01) |

(52) U.S. Cl.
CPC ....... *H04B 10/615* (2013.01); *G02B 6/29338* (2013.01); *H04B 10/676* (2013.01); *G02B 17/004* (2013.01); *H04B 10/5161* (2013.01)

(58) Field of Classification Search
CPC ............ H04B 10/615; H04B 10/676; H04B 10/5161; G02B 6/29338; G02B 17/004
USPC ........................................................ 398/212
See application file for complete search history.

(56) References Cited

U.S. PATENT DOCUMENTS

| | | | |
|---|---|---|---|
| 3,936,603 | A | 2/1976 | Guppy et al. |
| 5,371,623 | A | 12/1994 | Eastmond et al. |
| 5,581,575 | A | 12/1996 | Zehavi et al. |

(Continued)

FOREIGN PATENT DOCUMENTS

| | | |
|---|---|---|
| JP | H0591047 A | 4/1993 |
| WO | 0195534 A2 | 12/2001 |
| WO | 2016170466 A1 | 10/2016 |

OTHER PUBLICATIONS

Arimoto et al., "High-speed free-space laser communication", Performance and Management of Complex Communications Networks, 1998, pp. 175-190.

(Continued)

*Primary Examiner* — Juan A Torres
(74) *Attorney, Agent, or Firm* — Lando & Anastasi, LLP

(57) ABSTRACT

Optical signal receivers and methods are provided that include multiple optical resonators, each of which receives a portion of an arriving optical signal. Various of the optical resonators are tuned or detuned from a carrier wavelength, and produce an intensity modulated output signal in response to modulation transitions in the arriving optical signal. A detector determines modulation transitions in the arriving optical signal by analyzing the intensity modulation output signals from the optical resonators.

17 Claims, 10 Drawing Sheets

(56) References Cited

U.S. PATENT DOCUMENTS

| | | | |
|---|---|---|---|
| 5,684,793 A | 11/1997 | Kiema et al. | |
| 6,456,422 B1* | 9/2002 | Hayes | H04B 10/118 359/325 |
| 7,259,901 B2* | 8/2007 | Parsons | H04L 27/223 359/237 |
| 7,411,726 B2* | 8/2008 | Caplan | H04J 14/02 359/325 |
| 7,474,859 B2* | 1/2009 | Mahgerefteh | H04B 10/505 398/183 |
| 7,526,210 B2* | 4/2009 | Liu | H04B 10/66 359/279 |
| 7,529,490 B2* | 5/2009 | Hoshida | H04B 10/532 398/202 |
| 7,991,297 B2* | 8/2011 | Mahgerefteh | H04B 10/5561 398/185 |
| 8,295,712 B2 | 10/2012 | Chen et al. | |
| 8,411,351 B2 | 4/2013 | McCallion et al. | |
| 9,755,674 B2 | 9/2017 | Graceffo et al. | |
| 9,900,031 B2 | 2/2018 | Kowalevicz et al. | |
| 9,989,989 B2 | 6/2018 | Kowalevicz | |
| 2006/0013591 A1 | 1/2006 | Rohde | |
| 2007/0031150 A1 | 2/2007 | Fisher et al. | |
| 2008/0226300 A1 | 9/2008 | Mayer et al. | |
| 2008/0240736 A1 | 10/2008 | Ji et al. | |
| 2008/0266573 A1 | 10/2008 | Choi et al. | |
| 2012/0269523 A1* | 10/2012 | McCallion | H04B 10/677 398/202 |
| 2013/0272337 A1 | 10/2013 | Tan et al. | |
| 2014/0314406 A1 | 10/2014 | Zerbe et al. | |
| 2015/0318982 A1 | 11/2015 | Kowalevicz et al. | |
| 2015/0319061 A1 | 11/2015 | Kowalevicz | |
| 2016/0013870 A1 | 1/2016 | Sorin et al. | |
| 2018/0054259 A1 | 2/2018 | Kowalevicz et al. | |
| 2018/0091227 A1 | 3/2018 | Dolgin et al. | |
| 2018/0091228 A1 | 3/2018 | Kowalevicz et al. | |
| 2018/0091230 A1 | 3/2018 | Dolgin et al. | |
| 2018/0091232 A1 | 3/2018 | Dolgin et al. | |
| 2018/0102853 A1 | 4/2018 | Dolgin et al. | |
| 2018/0145764 A1 | 5/2018 | Dolgin et al. | |
| 2018/0145765 A1 | 5/2018 | Kowalevicz et al. | |
| 2018/0167145 A1 | 6/2018 | Dolgin et al. | |
| 2018/0205463 A1 | 7/2018 | Karpov et al. | |

OTHER PUBLICATIONS

Wright et al., "Adaptive optics correction into single mode fiber for a low Earth orbiting space to ground optical aommunication link using the OPALs downlink", Optics Express, vol. 23, Dec. 2015, pp. 1-8.

Andrews et al., "Final Report: Channel Characterization for Free-Space Optical Communications, Phase 0 testing at Hollister, CA, Phase 2 Final Testing at China Lake, CA", Jul 2012, pp. 1-60. Retrieved from <URL: http://www.dtic.mil/cgi-bin/GetTRDoc?Location=U2&doc=GetTRDoc.pdf&AD=ADA565323> and accessed on Nov. 17, 2017.

Juarez et al., "High-sensitivity DPSK receiver for high-bandwidth free-space optical communication links", Optics Express, vol. 19, May 2011, pp. 1-8.

Zhang, L. et al. "Microring-based Modulation and Demodulation of DPSK Signal" Optical Society of America, Optic Express, vol. 15, No. 18, Sep. 3, 2007.

Fang et al., "Multi-channel Silicon Photonic Receiver Based on Ring-resonators", Optics Express, vol. 18, No. 13, pp. 13510-13515, Jun. 21, 2010.

Xu et al., "Optical Differential-Phase-Shift-Keying Demodulation Using a Silicon Microring Resonator", IEEE Photonics Technology Letters, vol. 21, pp. 295-297, No. 5, Mar. 1, 2009.

\* cited by examiner

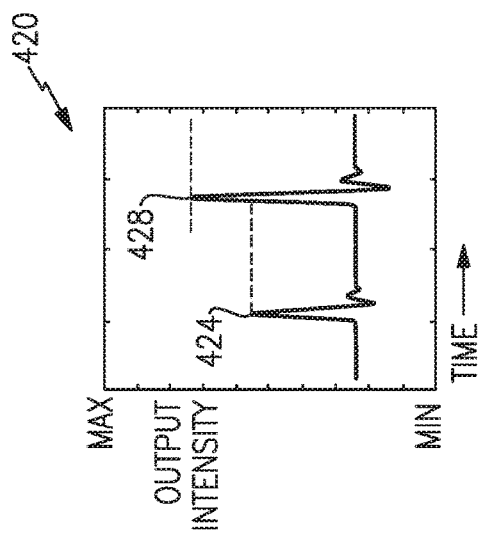
FIG. 4C
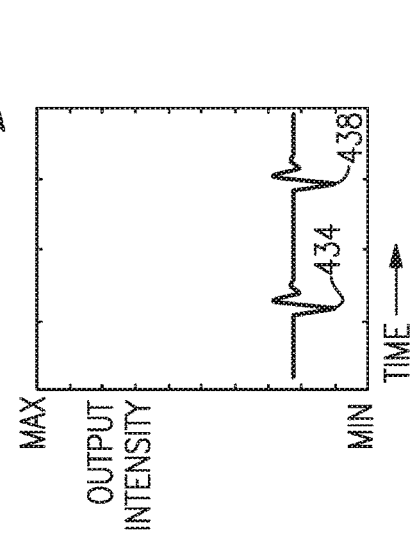
FIG. 4D
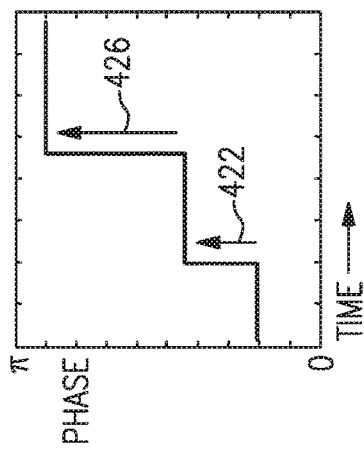
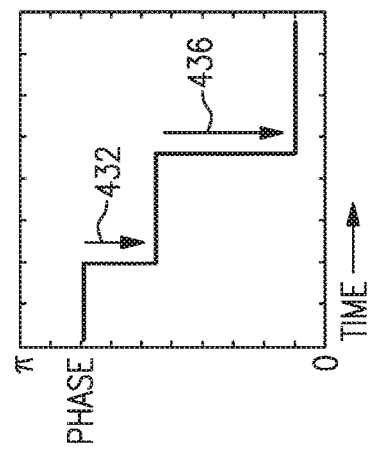

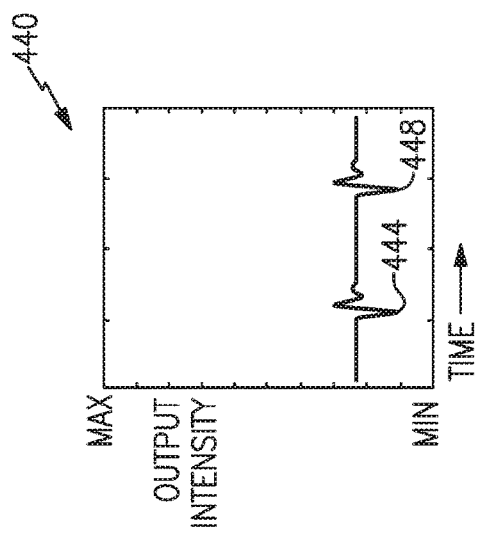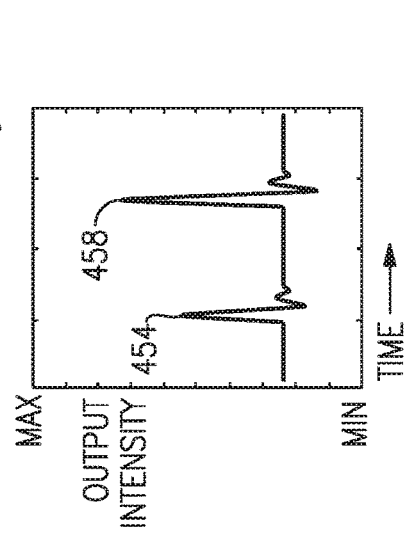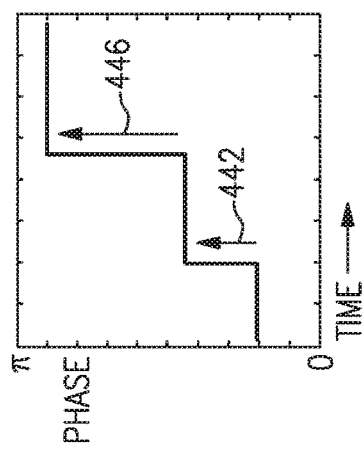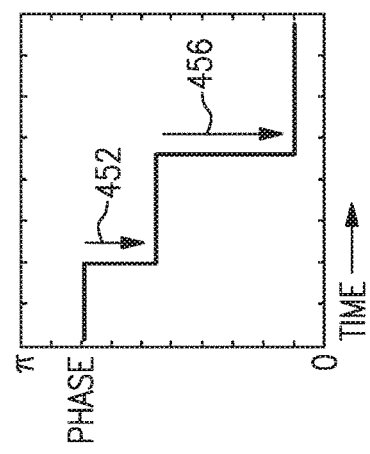
FIG. 4E
FIG. 4F

DEMODULATION OF QAM MODULATED OPTICAL BEAM USING FABRY-PEROT ETALONS AND MICRORING DEMODULATORS

CROSS-REFERENCE TO RELATED APPLICATIONS

This application claims the benefit under 35 U.S.C. § 119(e) of U.S. Provisional Patent Application No. 62/424,084 titled DEMODULATION OF QAM MODULATED OPTICAL BEAM USING FABRY-PEROT ETALONS AND MICRORING DEMODULATORS and filed on Nov. 18, 2016, which is herein incorporated by reference in its entirety for all purposes.

BACKGROUND

Light waves may be made to carry information by modulating a light source, often a laser source, to change various properties of the light, such as its amplitude, phase, frequency, wavelength, etc. The light waves may be in the visible spectral band, the infrared spectral band, or another region of the electromagnetic spectrum. In some cases, an underlying signal, such as a radio frequency signal, may be modulated via amplitude, phase, or frequency modulation, or any combination thereof, and the light source may be modulated by the underlying signal. Optical receivers receive the light waves and measure properties or variations of the light wave, such as the amplitude, phase transitions, and the like, from which the underlying signal and the information may be recovered.

Quadrature Amplitude Modulation (QAM) of light signals includes both phase modulation and amplitude modulation. Information encoded in phase and amplitude modulation may include transmitted communication data, or may include other information such as information about the source of the optical signal, interaction of the optical signal with an object, the optical channel through which the optical signal traveled, and/or objects with which it interacted. Compared to typical amplitude modulation receivers, receivers capable of demodulating phase modulation can be significantly more complex, requiring precision optics, local oscillators, gratings (such as Fiber Bragg Gratings), and/or delay line interferometers (DLI), etc. Receivers for high-order coherently encoded signals require frequency controlled lasers to serve as local oscillators (LO), multiple detectors, and significant digital signal processing (DSP).

SUMMARY

Aspects and examples described herein provide systems and methods for demodulation of phase and amplitude encoded information from optical signals. In particular, certain examples of the system include a receiver having an optical resonator, such as a Fabry-Perot filter/resonator, micro-ring, or other resonator, for converting phase-encoded optical signals into one or more intensity-encoded optical signals. The intensity-encoded optical signals may be easily converted to electrical signals, and processed to determine phase variations in the originally received optical signal, as well as amplitude variations, to recover QAM encoded information from the received optical signal, at lower cost and complexity of the receiving system than conventional approaches. Moreover, optical resonators may function over a broad range of modulation rates without requiring modification to accommodate varying modulation rates.

Two or more optical resonators may be employed to pass information about amplitude and phase variations in a received signal, converting them into intensity-encoded output signals and thereby allowing QAM demodulation. Accordingly, the systems and methods disclosed herein may provide the flexibility to accommodate various encoding techniques and various modulation rates (e.g., baud rates).

According to one aspect, an optical signal receiver is provided that includes a first optical resonator configured to receive an arriving optical signal, and to emit first output optical signal energy in response to receiving the arriving optical signal, a second optical resonator configured to receive the arriving optical signal, and to emit second output optical signal energy in response to receiving the arriving optical signal, and a detector configured to determine a phase transition in the arriving optical signal based upon a transient peak of at least one of the first output optical signal energy and the second output optical signal energy.

In some embodiments, the detector determines an amplitude transition in the arriving optical signal based upon a steady-state settling intensity of at least one of the first output optical signal energy and the second output optical signal energy.

In some embodiments, the detector determines a magnitude and a direction of the phase transition, the direction of phase transition being determined by which of the first output optical signal energy or the second output optical signal energy exhibits a greater transient peak, and the magnitude of phase transition being determined based upon an amplitude of the greater transient peak.

In certain embodiments, the first optical resonator is configured to produce a greater transient peak in the first output optical signal energy responsive to a positive phase transition in the arriving optical signal than to a negative phase transition in the arriving optical signal, and the second optical resonator is configured to produce a greater transient peak in the second output optical signal energy responsive to a negative phase transition in the arriving optical signal than to a positive phase transition in the arriving optical signal.

According to some embodiments, each of the first and second optical resonators is an etalon having two semi-reflective surfaces configured to at least partially trap optical signal energy by reflecting a portion of optical signal energy impinging upon each of the semi-reflective surfaces. Each of the first and second optical resonators has an optical dimension between their respective two semi-reflective surfaces, and the optical dimension of the first optical resonator may differ from the optical dimension of the second optical resonator by a fraction of a wavelength.

Certain embodiments also include a third optical resonator configured to receive the arriving optical signal and to emit third output optical signal energy in response to receiving the arriving optical signal, and the detector is configured to determine the phase transition based at least in part upon a comparison between at least two of the first output optical signal energy, the second output optical signal energy, and the third output optical signal energy.

According to another aspect, a method of detecting information encoded in an optical signal is provided and includes receiving a portion of the optical signal at each of a plurality of optical resonators, accumulating optical signal energy in each of the plurality of optical resonators, emitting an output optical signal from each of the plurality of optical resonators, each respective output optical signal being based at least in part on the accumulated optical signal energy in a respective one of the plurality of optical resonators, varying an intensity level of one or more of the output optical signals responsive to a modulation transition in the optical signal, detecting the variation in intensity level of one or more of the output optical signals, and determining the modulation transition in the optical signal based on the detected one or more variations in intensity level.

In some embodiments, determining the modulation transition of the optical signal includes determining a magnitude and a direction of a phase transition in the optical signal. Determining the magnitude of the phase transition may be based upon a transient peak intensity of one or more of the output optical signals. Determining the modulation transition of the optical signal may also include determining an amplitude transition in the optical signal, and determining the amplitude transition may be based upon a steady-state settling intensity of one or more of the output optical signals.

In certain embodiments, accumulating the optical signal energy in each of the plurality of optical resonators includes partially reflecting the optical signal energy between semi-reflective surfaces.

According to another aspect, an optical receiver is provided that includes a first resonator configured to at least partially accumulate optical signal energy, having an aperture to allow a portion of an optical signal to enter and an output to provide a first output signal, the first resonator configured to cause the first output signal to exhibit a transient peak in response to a phase advance in the optical signal, a second resonator configured to at least partially accumulate optical signal energy, having an aperture to allow a portion of the optical signal to enter and an output to provide a second output signal, the second resonator configured to cause the second output signal to exhibit a transient peak in response to a phase retreat in the optical signal, and a receiver configured to receive the first and second output signals and to determine a phase transition in the optical signal based upon a transient peak in at least one of the first output signal or the second output signal.

In certain embodiments, each of the first and second resonators is an etalon having two semi-reflective surfaces configured to at least partially trap optical signal energy by reflecting a portion of optical signal energy impinging upon each of the semi-reflective surfaces.

In some embodiments, each of the first and second resonators is a micro-ring having an optical loop configured to at least partially trap optical signal energy.

According to some embodiments, the first resonator has at least one dimension having a first value selected to allow the first resonator to resonantly accumulate the optical signal energy, wherein a corresponding at least one dimension of the second resonator has a second value selected to accumulate the optical signal energy in a non-resonant mode.

In certain embodiments, the first resonator has a first dimension selected to accumulate the optical signal energy in a non-resonant mode, and the second resonator has a corresponding second dimension selected to accumulate the optical signal energy in a non-resonant mode, the first dimension being less than a resonant dimension and the second dimension being greater that the resonant dimension. The first dimension and the second dimension may differ by a nominal amount that is a quarter of a wavelength or less in some embodiments.

In some embodiments, the receiver is configured to determine an amplitude transition in the optical signal based upon at least one steady-state value of at least one of the first and second output signals.

Still other aspects, examples, and advantages are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures:

FIGS. 4A-4F are schematic diagrams illustrating examples of output responses of various optical resonators to phase transitions in a received optical signal;

DETAILED DESCRIPTION

Figure 1C:
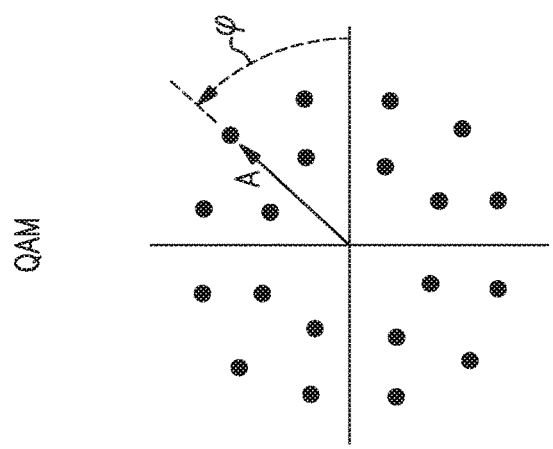
FIGS. 1A-1C are schematic diagrams of phase constellations for various modulation schemes.

Various aspects and embodiments are directed to improved systems and methods for demodulation of coherent phase-encoded (i.e., phase modulated) optical signals that may also have amplitude modulation, e.g., QAM optical signals. In certain examples, the system includes two or more optical resonators, such as Fabry-Perot filter/resonators, fiberoptic loops, or fiberoptic micro-rings, which convert received phase-transitions into intensity variations at an output. An output signal level may also indicate an amplitude variation in a received signal. Accordingly, analysis of the intensity variations from two or more optical resonators may allow determination of various phase and amplitude transitions of a received optical signal, and thereby demodulate the received optical signal. Aspects and embodiments are directed to receivers that include such optical resonators as detector and converter elements.

Variation of output intensity from an optical resonator may depend on three parameters: changes in the arriving optical signal (e.g., phase, amplitude), optical length of the resonator (Fabry-Perot etalon, micro-ring), and a combination of absorption, reflection, and other secondary characteristics of the optical resonator. Certain embodiments provide a demodulator that includes two or more etalons. In particular, according to certain embodiments, the use of three etalons, one of which may have an effective (roundtrip) length equal to an integer number of wavelengths of the transmission beam light (the etalon is tuned), and the others being out of tune with the received light, are sufficient for demodulation. The comparison of the outputs of the two or three etalons permits the demodulation of a received QAM optical signal.

Conventional receivers used to demodulate these modulation formats require a local laser reference and clock synchronization, both of which need to be synchronized with an external source, and as a result are bulky, costly, power intensive, and unreliable.

Aspects and embodiments described herein allow for self-referenced (passive) demodulation of complex encoding formats, including QAM, using two or more Fabry-Perot etalons or microrings. This approach may eliminate the need for laser sources, fiber couplers, phase shifters, etc. in the receiver, while also reducing processing power and hardware requirements.

Optical signals may be phase and/or amplitude modulated via various sources and/or processes. Detection and determination of the phase encoding may be useful for many purposes. A coherent optical signal, such as a laser beam, may be purposefully modulated by a data communications transmitter for instance, to encode communicated information on the optical signal. Numerous processes may phase and/or amplitude modulate a coherent light source, from which information about the process may be recovered by appropriate demodulation (e.g., interpreting) of the modulated optical signal. For example, various measurement systems may transmit an optical signal and analyze a reflected signal to determine dimensions, movement, defects, etc. Examples of various systems for which demodulation of phase and/or amplitude modulated optical signals may be beneficial include target designators, laser guidance systems, laser sight, laser scanners, 3D scanners, homing beacons and/or surveying systems, as well as communication systems. In some of these examples, an optical signal may arrive via a free space signal path (e.g., free space optical, FSO) or a fiber or other waveguide system. Systems and methods for demodulation of phase and/or amplitude modulated optical signals in accord with aspects and examples disclosed herein may be beneficially applied to any of the above-mentioned optical systems, or others, to receive, detect, recover, etc. useful information from an optical signal.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For the purposes of this disclosure, and as will be understood by those of skill in the art, the terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms light, light signal, and optical signal are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics.

In various embodiments, systems and methods are based on two optical resonators where a tuned resonator provides the value of a phase shift and a detuned resonator determines the sign of the phase shift. In other embodiments, the systems and methods are based on two detuned optical resonators where one resonator determines positive phase shifts and the other determines negative phase shifts. Certain embodiments include two or more optical resonators, none of which are necessarily tuned to a precise wavelength, but the amount of detuning from the received optical signal wavelength may be distinguished based on the real-time output of the resonators. In various embodiments, the optical resonators do not have to be tuned to a precise transmission rate or a precise optical wavelength. In general, aspects and embodiments described herein convert a QAM modulated optical signal into two or more parallel asynchronous intensity modulated signals that carry the same information as that contained in the received QAM modulation.

Accordingly, aspects and embodiments disclosed herein may eliminate the need for synchronization of reference laser wavelength, eliminate the need for lasers to serve as local oscillators, eliminate problems associated with polarization drift in optical fibers, reduce the number of detectors needed to account for polarization effects, reduce the amount of processor and/or DSP complexity required for high order coherent demodulation, and/or permit variable transmission rate with the same hardware, rather than requiring a precise optical delay, e.g., of a microring, to correspond to a transmission rate.

Figure 1B:
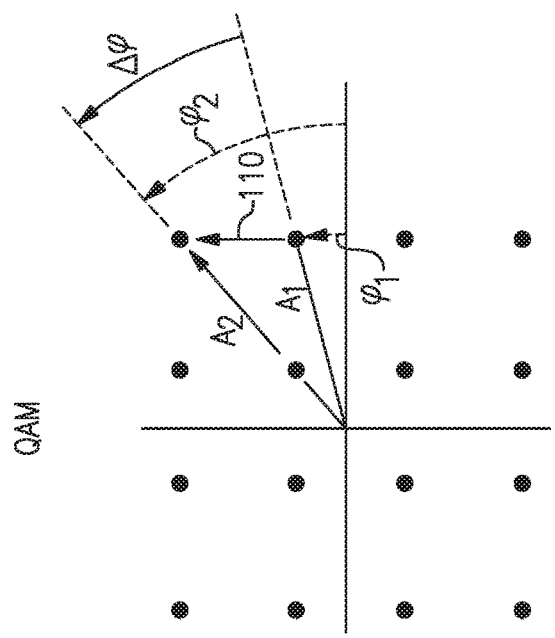
Figure 1A:
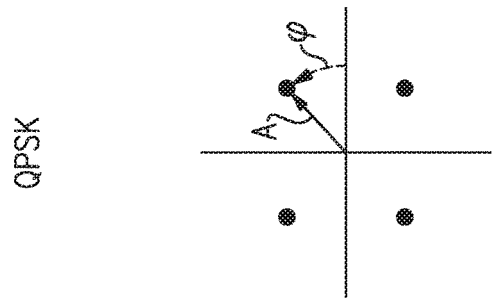

FIGS. 1A-1C illustrate examples of signal constellations for various modulation schemes, including QPSK (FIG. 1A) and QAM (FIGS. 1B-1C). The constellations shown, as well as lower and higher order constellations of M-PSK and QAM, may be accommodated, detected, and demodulated by the systems and methods described herein. Each point on each constellation represents an optical signal having a certain amplitude, A, and phase, $\Phi$. A transition from one point to another point on each constellation may include a change in amplitude, a change in phase, or both. For example, the modulation transition 110 includes a change in amplitude of $\Delta A = A_2 - A_1$ and a change in phase of $\Delta \varphi = \varphi_2 - \varphi_1$. A receiver that tracks changes in amplitude and phase may also thereby track absolute amplitude and phase of a received optical signal, with reference to an arbitrary starting phase, for instance.

Any phase or amplitude shift may cause a variation in the output signal of a resonator. For example, a phase shift may cause a transient disturbance while an amplitude shift may cause the output signal to settle at a new output intensity level than previously. A particular phase shift may cause a greater disturbance to the output signal than caused by a phase shift of lower magnitude, e.g., a greater phase shift causes a greater disturbance than a smaller phase shift. Further, a phase shift in one direction may cause a greater disturbance in a particular resonator than a phase shift of the same magnitude in an opposite direction (e.g., a positive phase shift versus a negative phase shift may cause different disturbances in an optical resonator).

A wavelength that does not create a resonant response in an optical resonator nonetheless establishes an output optical signal. Under such a condition, the optical resonator may be described as being untuned, or detuned, from the particular wavelength. A phase transition arriving at a detuned optical resonator causes a disturbance to the output signal, despite the lack of resonance. Additionally, an amplitude change arriving at a detuned optical resonator causes a change in the steady-state output signal level. Accordingly, phase and amplitude changes in an optical signal that arrive at either of a tuned or a detuned optical resonator vary the intensity of an output signal form the optical resonator, as described further herein. Such variations in output intensity may be detected and interpreted to determine the phase and amplitude changes in the arriving optical signal, thereby demodulating the arriving optical signal.

Figure 2:
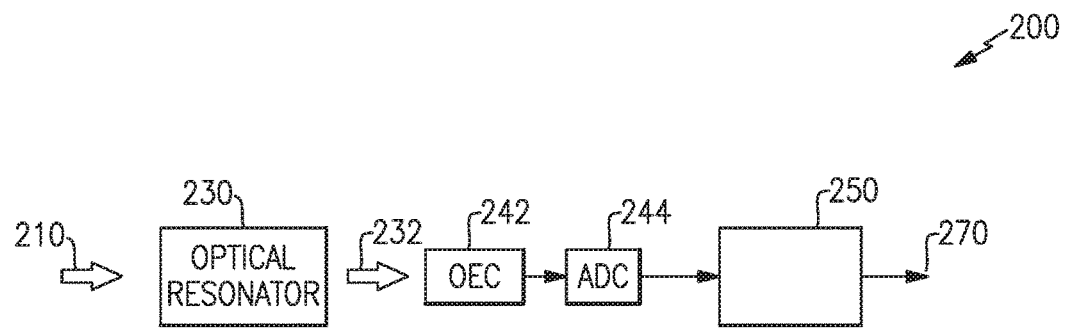
FIG. 2 is a block diagram of an optical receiver according to various examples described herein.

Referring to FIG. 2, illustrated is an example of an optical receiver 200 according to various examples discussed herein. The illustrated receiver 200 receives an optical signal 210 and includes an optical resonator 230 and a digital processing subsystem 250 that provides an output 270. The optical resonator 230 may be coupled to the digital processing subsystem 250 by an optical-electrical converter 242 and an analog to digital converter 244, for example.

Examples of optical resonators 230 may include Fabry-Perot etalons, micro-rings, or other types of resonators. The optical resonator 230 is a component capable of sensing transitions, such as phase transitions, representative of modulation of the received optical signal 210, and transforming the transitions into intensity modulation of an output optical signal, e.g., output optical signal 232. The optical resonator 230 converts the modulation of the arriving optical signal 210 in part by interaction of the arriving optical signal 210 with optical signal energy built-up or held in the optical resonator 230.

An optical signal received by an optical resonator 230 may establish a steady-state energy-conserving condition in which optical signal energy continuously arrives at the resonator, accumulates or adds to built-up energy existing inside the resonator, and emerges from the resonator at a constant rate. A change in the arriving phase, frequency, or amplitude of the optical signal may disrupt the steady-state condition, and the light intensity emerging from the resonator is thereby disrupted, until a steady state condition is re-established. Accordingly, a change in phase, frequency, or amplitude of the arriving optical signal 210 causes a change in intensity of the emerging optical signal 232. A large phase transition in the arriving optical signal 210, for example, causes a large (but temporary) intensity change in the emerging optical signal 232. Similar operation occurs in an etalon, optical loop, micro-ring, or other optical resonator. Accordingly an optical resonator 230 functions as a demodulator, or a modulation converter, for an optical signal 210. The emerging optical signal 232 may therefore carry the same information content as the arriving optical signal 210, but in intensity modulated form.

The emerging intensity-modulated optical signal 232 may be converted to an electrical signal by an optical-electrical converter, e.g., OEC 242, which may include a photodetector, such as a photodiode, for example. Accordingly, the output of the OEC 242 may be an amplitude modulated signal representative of the intensity-modulated optical signal 232, and may be converted to a digital form by an analog to digital converter, e.g., ADC 244. The digital signal is provided to the digital processing subsystem 250 for digital processing. The digital processing subsystem 250 processes the digital signal to retrieve the information-carrying content of the optical signal 210.

In various examples, a receiver in accord with aspects and examples disclosed herein may include additional or fewer optics than discussed above, and may omit or add various components relative to those discussed above. For example, focusing optics may be included to receive the emerging optical signal 232 from the optical resonator 230 and to focus the optical signal 232 onto the OEC 242. Certain examples may use analog receiver circuitry and therefore may omit the ADC 224. Various examples may include a channel estimator as part of the digital processing subsystem 250 to provide phase rotation or other signal adjustments as may be known in the art.

Figure 3:
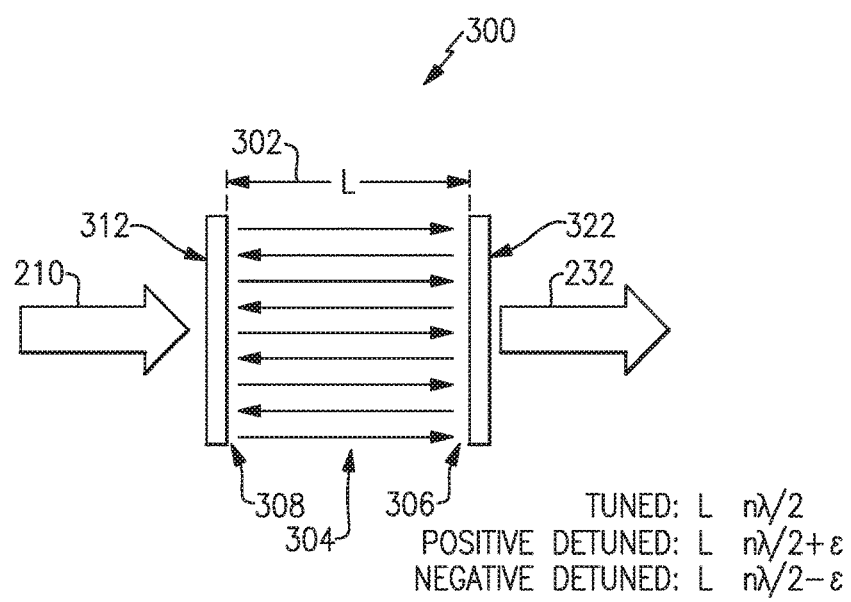
FIG. 3 is a schematic diagram of an example of an optical resonator.

As discussed above, suitable optical resonators may include etalons, micro-rings, or other structures. Some detail of at least one example of an etalon is discussed with respect to FIG. 3, which illustrates an example of an etalon 300 that may be used as an optical resonator 230 in accord with aspects and embodiments described herein. In particular, the etalon 300 may be used to convert phase and/or amplitude modulations of the received optical signal 210 into intensity or amplitude modulations of the output optical signal 232. The intensity or amplitude modulated output optical signal 232 may then be converted to an electrical signal in some embodiments, as discussed above. The etalon 300 exhibits output intensity variations in response to phase and/or amplitude transitions in the received optical signal 210.

The etalon 300 includes an interior 304 with semi-reflective surfaces 306, 308 that reflect optical signal energy into the interior 304. An input side 312 allows optical signal energy, such as the optical signal 210, into the interior 304. The input side 312 thereby forms an aperture through which the arriving optical signal 210 is received. An output side 322 forms an optical output, at least in part by action of the semi-reflective surface 306 to allow a portion of trapped optical signal energy from the interior 304 to emerge as an output optical signal, such as the output optical signal 232. Accordingly, the semi-reflective surface 306 is also semi-transmissive, such that optical signal energy arriving (from the interior 304) at the semi-reflective surface 306 is partially reflected back to the interior 304 and partially transmitted through to the output side 322. The etalon 300 may have varying levels of reflectivity of the semi-reflective surfaces 306, 308. In certain examples, the reflectivity may be expressed as a fraction of light amplitude reflected back into the interior 304, or may be expressed as a fraction of light intensity reflected back into the interior 304. In a particular example, an amplitude reflectivity of the first semi-reflective surface 308 may be r1=0.999 and an amplitude reflectivity of the second semi-reflective surface 306 may be r2=0.985. In other examples the reflectivity of each of the first and second semi-reflective surfaces may be different, and may be any suitable value for a particular implementation. The etalon 300 is one example of a suitable optical resonator in accord with aspects and embodiments described herein.

The use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like.

In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples.

In various embodiments, an optical loop or a micro-ring may also be a suitable optical resonator, formed of one or more waveguides in which at least one is a closed loop such that optical signal energy traversing "around" the loop may be phase aligned with a dimension of the loop at one or more frequencies. Accordingly, optical signal energy traversing the loop may constructively or destructively interfere with itself, at certain frequencies (wavelengths), and such constructive or destructive interaction may be disturbed by a phase change in an arriving optical signal. Accordingly phase and amplitude changes in the arriving optical signal may be detected and interpreted to demodulate the arriving optical signal. Similarly, the etalon 300 traps or stores some optical signal energy such that optical signal energy traversing the etalon may constructively or destructively interfere with itself in similar manner.

According to certain examples, an optical resonator, such as the etalon 300, will develop a steady-state output signal based on the input signal, and maintain a given level of the output signal until a modulation of the input signal occurs. When a phase modulation occurs in the input signal, self-interference (constructive or destructive) may cause a phase-dependent transient disturbance in the intensity of the output signal. Such a transient disturbance may depend upon the tuning of the etalon (or other optical resonator), as discussed in more detail below. Accordingly, an etalon 300 may have various states of tuning, relative to a received optical signal wavelength, $\lambda$. For example, a tuned etalon may have an optical interior dimension 302 (e.g., based upon the speed of light in the material of the interior 304) that is an integer number of half-wavelengths, e.g., $L=n\lambda/2$. A detuned etalon may be positively detuned by having a slightly larger dimension, e.g., $L=n\lambda/2+\varepsilon$, or be negatively detuned by having a slightly smaller dimension, e.g., $L=n\lambda/2-\varepsilon$. In some embodiments, the dimensional variant, c, may have a nominal value of one eighth wavelength, e.g., $\varepsilon=\lambda/8$. In other embodiments, the dimensional variant may have a nominal value of a tenth of a wavelength, e.g., $\varepsilon=\lambda/10$, or a twelfth of a wavelength, $\varepsilon=\lambda/12$. Other embodiments may have different nominal dimensional variants, $\varepsilon$, and any dimensional variant, $\varepsilon$, may be more or less precise in various embodiments.

Additionally, a positively detuned optical resonator with respect to a particular wavelength may be a negatively detuned optical resonator with respect to another wavelength. In some embodiments, tuning relative to a particular wavelength may be less significant than a difference in tuning between two or more optical resonators. For example, the positively and negatively detuned resonator dimensions discussed above may be equivalently described with respect to two optical resonators as being detuned by $2\varepsilon$ relative to each other, without regard to what wavelength might produce resonance in either of the optical resonators and/or an alternate or additional tuned resonator. Further details of the operation of a tuned resonator, and of detecting and demodulating phase modulations using a tuned resonator alongside a detuned resonator, may be found in co-pending U.S. patent application Ser. No. 15/725,457 filed on Oct. 5, 2017, and titled SYSTEMS AND METHODS FOR DEMODULATION OF PSK MODULATED OPTICAL SIGNALS, which is herein incorporated by reference in its entirety for all purposes.

Figure 4A:
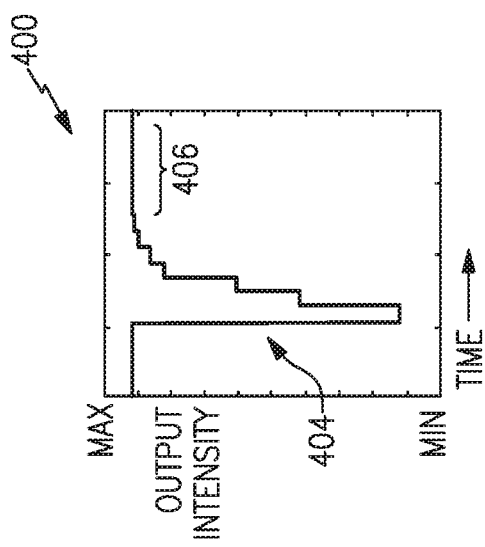
Figure 4A:
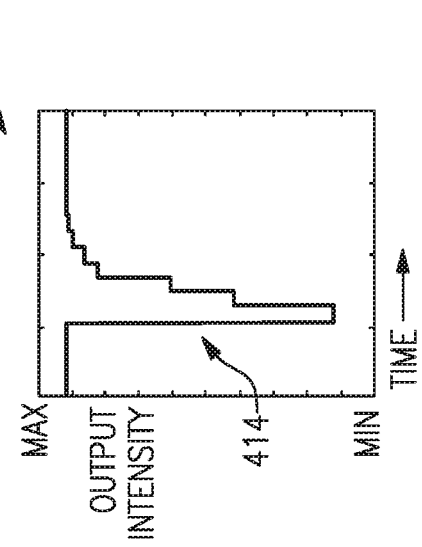
Figure 4A:
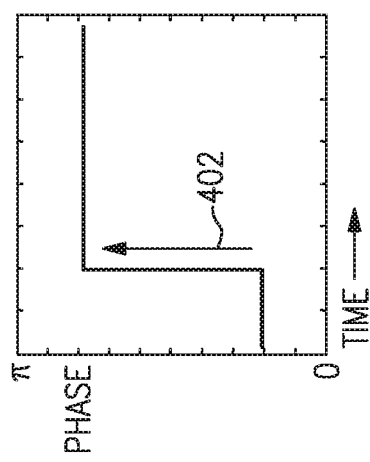
Figure 4B:
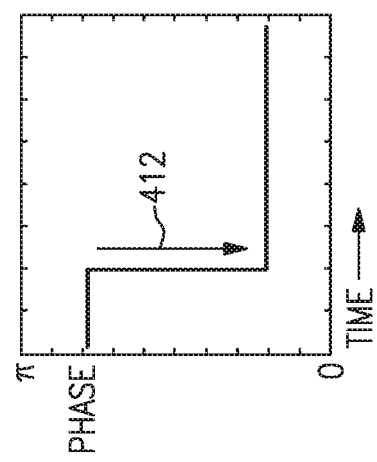

FIG. 4A illustrates an output intensity 400 from a tuned etalon in response to a positive phase transition 402 (e.g., a phase advance) in a received optical signal. For example, a positive phase transition is a transition in a signal $\sin(\omega t)$ to become, e.g., $\sin(\omega t+\Phi)$. At the time of the phase transition 402, the output intensity 400 exhibits a transient disturbance 404 that is a temporary reduction in the optical output signal. The tuned etalon exhibits a relatively high steady-state 406 value due to resonance in the etalon. The arrival of a phase transition 402 disturbs resonance in the tuned etalon and causes a temporary reduction in the optical output signal. Similarly, as illustrated in FIG. 4B, the output intensity 410 from a tuned etalon in response to a negative phase transition 412 (e.g., a phase retreat) may exhibit a similar transient disturbance 414 that is a temporary reduction in the optical output signal. A larger phase transition causes a larger temporary reduction in the optical output signal. Accordingly, an amount of phase transition may be determined by measuring the amount of intensity reduction in the optical output signal from a tuned etalon.

FIG. 4C illustrates an output intensity 420 from a positively detuned etalon in response to a phase advance 422, and a larger phase advance 426, in a received optical signal. The output intensity 420 is relatively low because the detuned etalon does not exhibit resonance at the wavelength of the received optical signal. The received optical signal energy nonetheless interacts with the detuned resonator by, e.g., entering through an aperture, partially reflecting at semi-reflective surfaces in an etalon or traversing a loop in a micro-ring, and emitting a portion of the signal energy at the output. Accordingly, phase transitions in the arriving optical signal cause transient disturbances to the output optical signal. The phase advance 422 causes a transient disturbance 424 that is a temporary positive peak in the output intensity 420. The larger phase advance 426 (e.g., up to 180 degrees or $\pi$ radians) causes a larger transient disturbance 428, a temporary positive peak having a greater amplitude than that of the earlier transient disturbance 424. Accordingly the peak amplitude of the transient disturbance 424 is indicative of the amount of phase transition in the phase advance 422, and the peak amplitude of the transient disturbance 428 is indicative of the amount of phase transition in the phase advance 426.

FIG. 4D illustrates an output intensity 430 from a positively detuned etalon in response to a phase retreat 432, and a larger phase retreat 436. Again the output intensity 430 is relatively low overall because the detuned etalon doesn't exhibit resonance. Each of the phase retreats 432, 436 causes a transient disturbance 434, 438, respectively. The transient disturbances 434, 438 may be less prominent in the positively detuned etalon, by comparison with response to positive phase transitions as shown in FIG. 4C. The transient disturbances 434, 438 may also exhibit less distinguishable difference in the amplitude of their respective negative peaks. Accordingly, the positively detuned etalon (or other optical resonator) may exhibit a diminished response to negative phase retreats than to phase advances.

FIGS. 4E-4F are similar to FIGS. 4C-4D, but illustrate output intensity 440, 450 from a negatively detuned etalon in response to various phase advances and retreats in a received optical signal. The phase advances 442, 446 cause transient disturbances 444, 448, respectively, that are relatively minor negative peaks. The phase retreats 452, 456 cause transient disturbances 454, 458, respectively, that are positive peaks with amplitudes indicative of the amount of phase transition in their respective phase retreats 452, 456.

With continued reference to the above described responses of tuned and detuned optical resonators with respect to phase transitions in an arriving optical signal, a general phase transition of any size and direction may be detected and distinguished by a combination of any two optical resonators, at least one of which is detuned from the wavelength of the arriving optical signal. In a first example, a tuned optical resonator exhibits a temporary reduction in output signal intensity and the amount of phase transition may be determined by the amount of reduction in output signal intensity. The direction of the phase transition (advance or retreat) may be determined by analyzing the output signal intensity from a detuned optical resonator, e.g., for a positively detuned resonator, a positive peak indicates a positive phase transition and no positive peak (or a minor negative peak) indicates a negative phase transition. In a second example, a positively detuned optical resonator detects positive phase transitions by producing a positive output peak whose amplitude is indicative of the amount of the phase transition, and a negatively detuned optical resonator detects negative phase transitions by producing a positive output peak whose amplitude is indicative of the amount of the phase transition. Accordingly, either of the first example or the second example (each having a pair of optical resonators) may uniquely distinguish both phase advances and phase retreats and the amount of the phase advance or retreat.

Additionally, analysis of the output optical signal from two or more optical resonators may identify whether either is tuned (resonant) (e.g., relatively high output intensity, similar response to both positive and negative phase transitions) and/or detuned. Further, a received optical signal that drifts in wavelength may cause a tuned optical resonator to become a detuned optical resonator, and vice-versa, and a digital processing subsystem, such as the digital processing subsystem 250 of FIG. 2, may be configured (e.g., programmed) to analyze output intensities from two or more optical resonators to determine whether they are detuned or whether one is tuned, and interpret the output signals accordingly. While distinction of any general phase transition is achievable by systems and methods described herein having only two optical resonators, various embodiments may operate more robustly having three or more resonators, for example, such that there is no possibility of having to rely on two optical resonators, e.g., that may each be detuned in the same direction relative to an arriving optical signal wavelength. Accordingly, to account for an arriving optical signal having a general wavelength, or to account for an arriving optical signal subject to wavelength drift or variation, or to account for dimensional changes of the optical resonators, e.g., due to temperature, manufacturing tolerance, or the like, certain embodiments may include three or more optical resonators each having an optical dimension different from the others by some amount, such as but not limited to a fixed dimensional variant, $\varepsilon$, as described in more detail below with respect to FIG. 7.

Any general phase transition may be determined by systems and methods as described above. Demodulation of QAM optical signals further requires demodulation of amplitude transitions as well as phase transitions. In some embodiments, an additional optical detector, such as a photodetector, may simply detect the intensity of the arriving optical signal and directly indicate transitions in amplitude. In some embodiments, the output optical signal from one or more optical resonators may be further analyzed to determine amplitude transitions. In some embodiments, one or more optical resonators may provide an output optical signal that is used for determining both phase transitions and amplitude transitions in an arriving optical signal.

Figure 5A:
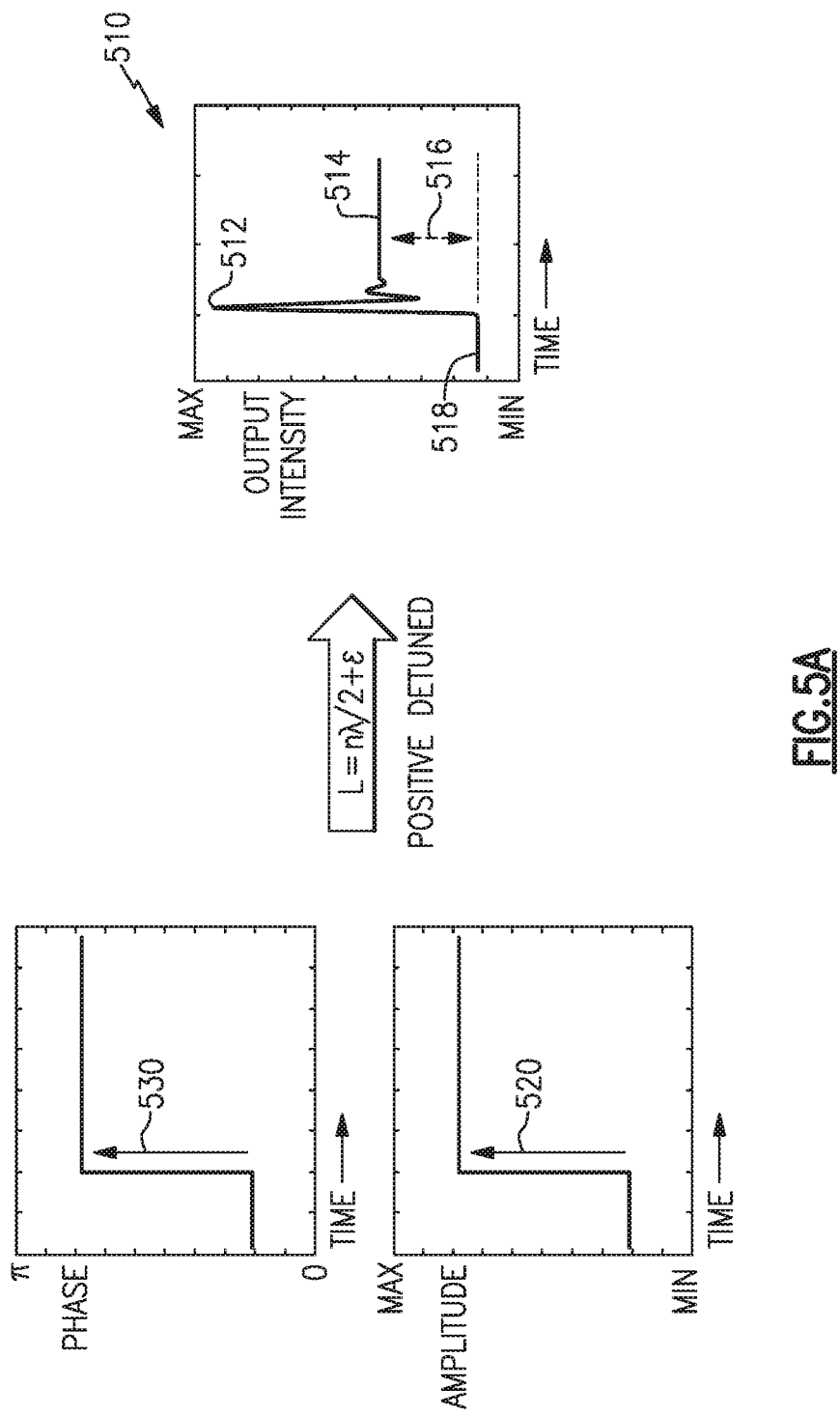
FIGS. 5A-5B are schematic diagrams illustrating examples of output responses of various optical resonators to phase and amplitude transitions in a received optical signal.

FIG. 5A illustrates an output intensity 510 from a positively detuned optical resonator in response to a positive amplitude transition 520 occurring in combination with a positive phase transition 530. The phase transition 530 causes a transient disturbance 512 that is a positive peak whose amplitude indicates the amount of phase transition. The amplitude transition 520 causes a new steady-state level 514 of output intensity, which may also be referred to herein as a new settling level 514 of the output intensity 510, e.g., the output intensity 510 settles at a new level 514 due to the amplitude transition 520. The new settling level 514 of the output intensity 510 is a change 516 from a prior steady-state level 518, and the change 516 is indicative of the amount of the amplitude transition 520.

For each of a tuned optical resonator, a positively detuned optical resonator, and a negatively detuned optical resonator, a change in amplitude of the arriving optical signal (e.g., an amplitude transition) causes output intensity from the resonator to settle at a new steady-state level, without regard for whether a phase transition accompanied the amplitude transition. In certain embodiments the steady-state output intensity may be directly measured to indicate the amplitude of the arriving optical signal. In other embodiments, the change in the steady-state output intensity may be measured to determine a change in amplitude of the arriving optical signal. In some embodiments, a combination of the absolute steady-state output intensity and/or changes in the steady-states output intensity may be used to demodulate the amplitude variations in the arriving optical signal.

Figure 5B:
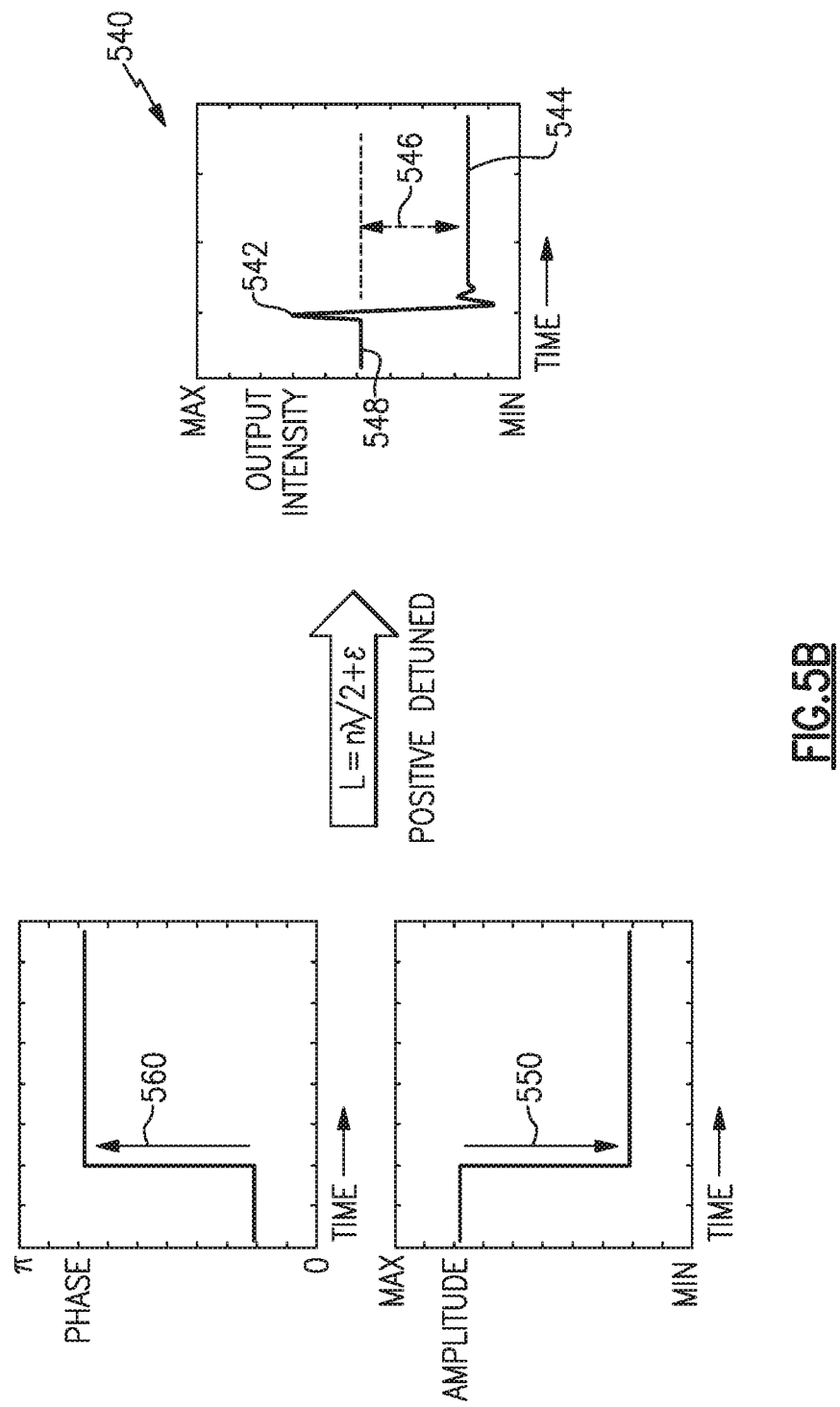

FIG. 5B illustrates an output intensity 540 from a positively detuned optical resonator in response to a negative amplitude transition 550, in combination with a positive phase transition 560. The phase transition 560 causes a transient disturbance 542 that is a positive peak whose amplitude indicates the amount of phase transition. The amplitude transition 550 causes a new steady-state level 544 of output intensity. As above, the output intensity 540 settles at a new level 544 based upon the new amplitude of the arriving optical signal, e.g., after the amplitude transition 550. The new settling level 544 is a change 546 from a prior steady-state level 548, and the change 546 is indicative of the amount of the amplitude transition 550.

For a given phase transition 530, 560 the resulting positive peak 512, 542, respectively, may have differing peak amplitudes due to the concurrent amplitude transition 520, 550. The fact of the new settling level 514, 544 being higher or lower may affect the peak amplitude of the positive peaks 512, 542. Accordingly, in some embodiments, analysis of peaks and peak amplitudes in the output optical signal from a detuned optical resonator (positive or negative) may depend upon analysis of concurrent amplitude modulations, which may be determined by a separate optical detector (as described above) or by analysis of a changed settling level (a new steady-state output intensity) from one or more optical resonators.

While FIGS. 5A-5B illustrate responses of a positively tuned optical resonator, a negatively detuned resonator exhibits similar responses to a phase retreat in combination with an amplitude increase and an amplitude decrease, respectively. Further, while a positively detuned resonator may have diminished transient response to a phase retreat, and a negatively detuned resonator may have diminished transient response to a phase advance, the steady-state output response of each type of detuned resonator may increase or decrease in response to an amplitude transition in the arriving optical signal. Accordingly, an amplitude transition may be determinable in various embodiments from any of a positively detuned resonator, a negatively detuned resonator, a tuned resonator, or a photodetector, without regard to whether a phase transition accompanies the amplitude transition.

A summary of the various responses of various optical resonator tuned conditions to various transitions in an arriving optical signal is presented in Table 1.

case of the optical system 600a, an arriving optical signal 610 is split by a splitter 612 such that a portion of the arriving optical signal 610 arrives at the positively detuned resonator 602 and another portion arrives at the negatively detuned resonator 604. In the optical system 600b, various portions of an arriving optical signal 610 arrive at each of the positively detuned resonator 602 and the negatively detuned resonator 604 without a splitter. Each of the positively detuned resonator 602 and the negatively detuned resonator 604 operates as previously discussed.

Each of the positively detuned resonator 602 and the negatively detuned resonator 604 receives a portion of the arriving optical signal and, as discussed, converts phase and amplitude transitions into intensity modulations of respective output optical signals 622, 624. The output optical signals 622, 624 may be focused to varying extent by respective optics 632, 634 (e.g., lens), in some examples, to provide focused output optical signals 642, 644. In other examples the output optical signals 622, 624 may not be focused. Either of the output optical signals 622, 624 or the focused output optical signals 642, 644 may be provided to a respective optical-electrical converter 652, 654, which may be a photodetector, such as a photodiode, as discussed previously, to convert the intensity modulated output optical signal energy into an electrical signal, which may further be converted to a digital format, also as discussed previously. Intensity variations in the output optical signals 622, 624 and/or amplitude variations in an electrical signal output by the converters 652, 654, may accordingly indicate phase and amplitude transitions in the arriving optical signal 610. As discussed above, the positively and negatively detuned resonators 602, 604 may differ from a tuned resonator in an

TABLE 1

Optical Resonator Output Intensity Variations

| Received Modulation | Tuned $L = n\lambda/2$ | Positively Detuned $L = n\lambda/2 + \varepsilon$ | Negatively Detuned $L = n\lambda/2 - \varepsilon$ |
| --- | --- | --- | --- |
| Phase Advance (+) | Temporary Reduction | Positive Peak | Minor Reduction |
| Phase Retreat (−) | Temporary Reduction | Minor Reduction | Positive Peak |
| Amplitude Increase | Settles Higher | Settles Higher | Settles Higher |
| Amplitude Decrease | Settles Lower | Settles Lower | Settles Lower |

In accord with all the above, variation in emerging light intensity from an optical resonator, such as the etalon 300 or a micro-ring, indicates that a transition occurred in an arriving optical signal, such as a phase, frequency, or amplitude variation, and such may be used by appropriate signal processing to determine useful information by analyzing the emerging light intensity. Accordingly, appropriate processing of the intensity modulated output optical signals from two or more optical resonators, in electrical form in some examples, and optionally in digital form, may interpret the intensity variations to determine amplitude and phase transitions of an arriving optical signal, and therefore determine phase and amplitude modulations of a generalized QAM signal.

Figure 6A:
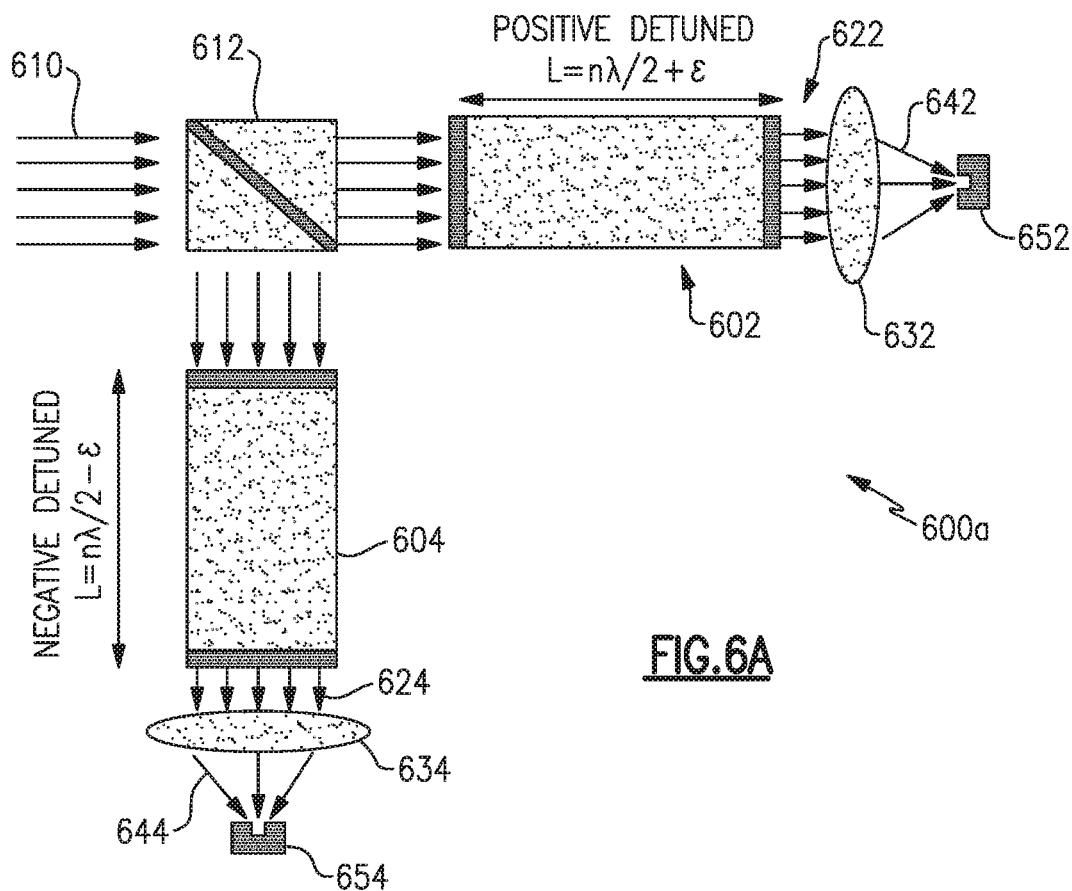
FIGS. 6A-6B are schematic diagrams of examples of optical receiver portions utilizing an optical resonator.
Figure 6B:
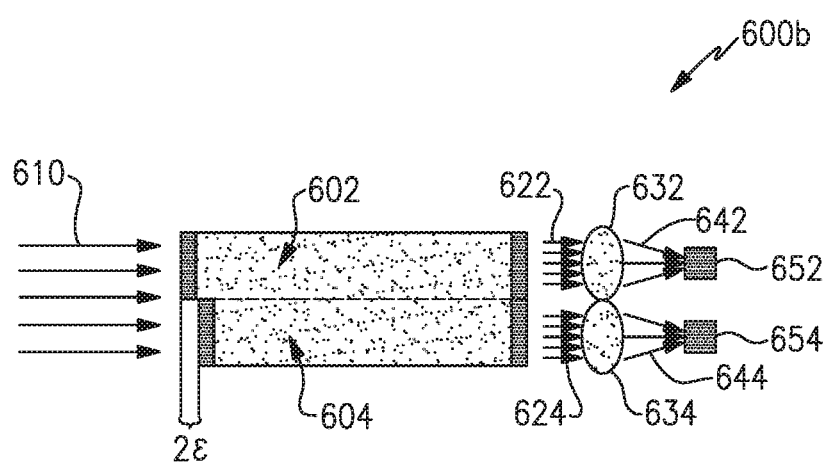

FIG. 6A illustrates an optical system 600a and FIG. 6B illustrates an optical system 600b, each of which may operate as combination optical resonators to allow detection and demodulation of phase transitions and amplitude transitions, as discussed above, having various magnitude and direction. Each of the optical systems 600 shown includes a positively detuned resonator 602 and a negatively detuned resonator 604, that are etalons as shown but may be other forms of optical resonators as previously described. In the optical dimension by an amount, ε, that may be an eighth of a wavelength, a tenth of a wavelength, or another amount. In some embodiments, the positively and negatively detuned resonators 602, 604 may differ from each other by an amount, 2ε, without regard to a tuned resonator, e.g., one of the detuned resonators 602, 604 may be closer to resonance (e.g., more nearly tuned), with respect to the wavelength of the arriving optical signal 610, than the other.

Figure 7:
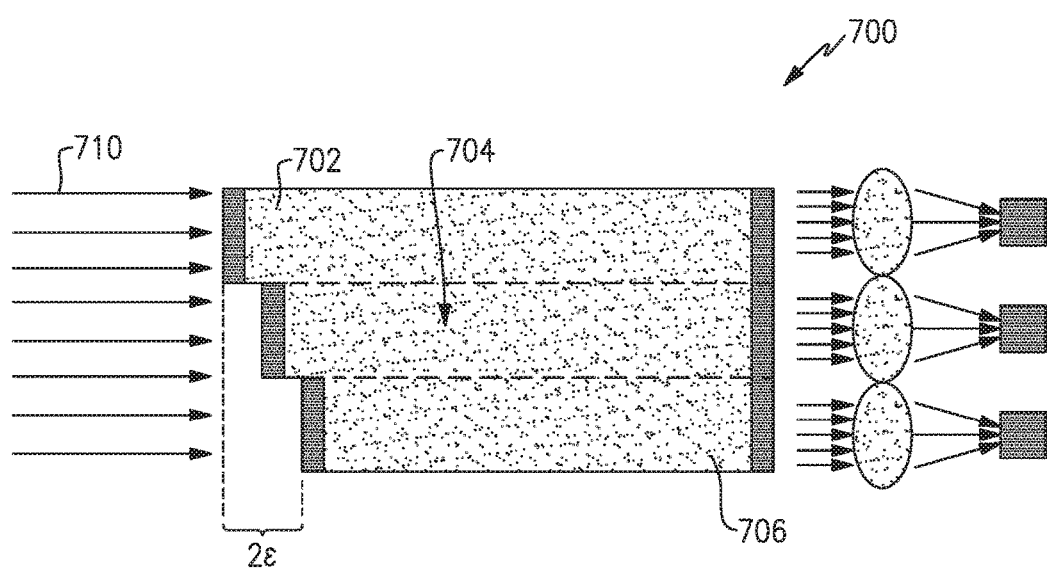
FIG. 7 is a schematic diagram of another example of an optical receiver portion utilizing an optical resonator.

FIG. 7 illustrates an optical system 700 having three optical resonators 702, 704, 706, each of which is configured to receive a portion of an arriving optical signal 710. In some embodiments, the optical signal 710 may be split by a splitter similar in manner to FIG. 6A, to provide a portion to each of the optical resonators 702, 704, 706. In some embodiments, each of the optical resonators 702, 704, 706 may have an associated focusing optic and/or respective optical-electrical converter, as shown. In some embodiments, one of the optical resonators 702, 704, 706 may be tuned. In other embodiments, none of the optical resonators 702, 704, 706 may be tuned. The arriving optical signal 710 may, in some instances, be somewhat unstable and may have variation or drift in wavelength thereby causing one or other of the optical resonators 702, 704, 706 to enter a tuned state relative to the arriving wavelength at various times. Additionally, changes in temperature may cause variations in dimensions of one or more of the optical resonators 702, 704, 706 that shift one or more of the optical resonators 702, 704, 706 toward or away from a tuned state. In some embodiments, a difference between the most positively detuned resonator and the most negatively detuned resonator may be established as a nominal dimensional variant, $2\varepsilon$, where $\varepsilon$ may equal various values to accommodate varying operational requirements. In some embodiments, $\varepsilon$ may nominally equal an eighth of a wavelength or a tenth of a wavelength. In various embodiments, $\varepsilon$ may nominally equal a fraction of a wavelength in the range of a half wavelength to a sixteenth of a wavelength or less. In some embodiments, the optical resonators 702, 704, 706 may be etalons. In some embodiments, the optical resonators 702, 704, 706 may be optical loops or micro-rings, and $\varepsilon$ may have differing nominal value for an optical loop or micro-ring embodiment relative to an etalon embodiment. Various embodiments may include additional optical resonators of nominally tuned or detuned dimension to accommodate a range of potential desired arriving optical signals, or a range of fluctuation of a desired arriving optical signal, having varying wavelengths, or any combination thereof. In various embodiments including multiple optical resonators, a dimensional difference between the resonator with the largest optical dimension and the resonator with the smallest optical dimension may be a fraction of a wavelength, or may be on the order of a wavelength or multiple wavelength, to accommodate varying applications and/or operational parameters. In each of these various embodiments, intensity modulation of output optical signals from the respective optical resonators may each be analyzed, e.g., by a digital processing subsystem, to demodulate phase and amplitude modulations of a general QAM optical signal in accord with the systems and methods described above.

Advantages of the aspects and embodiments described herein are numerous. For example, optical components may be lower cost or less complex than those required for conventional systems, such as allowing for coated or uncoated glass rather than crystal or expensive coatings. Use of optical resonators, such as etalons, for converting phase modulation into intensity modulation, may be advantageously designed to incorporate filtering (e.g., rejection of unwanted signals, via resonant dimensions, for example) which may provide improved signal-to-noise characteristics. Aspects and embodiments in accord with those described herein may satisfactorily operate in extreme aberration or turbulence in which adaptive optics would fail. Further, aspects and embodiments in accord with those described herein may achieve free-space optical communications with low size, weight, power, and cost requirements, improving support for platforms such as unmanned aerial vehicles and microsatellites.

It should be appreciated that the variation to output intensity caused by modulation of an arriving light signal may vary with resonant physical dimensions of an optical resonator, such as the dimensional length of an etalon or micro-ring, and how accurately it is manufactured, e.g., how well tuned the etalon is to one or more wavelengths. Output intensity from a tuned etalon with a smaller dimensional length is more quickly disrupted by a transition in the input signal, and more quickly re-establishes a steady state after such a transition, relative to a tuned etalon with a larger resonant dimension. Additionally, an etalon manufactured to a more accurate tolerance, i.e., more accurately tuned to the particular wavelength, may provide a higher steady-state output signal intensity and may exhibit greater sensitivity to transitions in input signals, relative to an etalon manufactured to a less accurate tolerance.

Various embodiments may have various etalon dimensions and tolerances based upon particular design criteria and to accommodate varying operational characteristics. In some examples, various etalon dimensions and tolerances may be selected to trade off, or balance, how strongly and/or how quickly the etalon responds to transitions in an arriving optical signal, and how quickly and/or how strongly the etalon approaches a return to steady-state after a transition. Additionally, various etalon dimensions and tolerances may be selected to optimize a receiver, such as the receiver 200, for a particular data rate and/or a particular wavelength.

Certain embodiments may incorporate various additional aspects or components to further provide selectivity of one light signal over another. For example, light of certain wavelengths may be preferred or rejected through the use of frequency selective filters, frequency selective coatings, and/or by selection of frequency selective dimensions or other features of an optical resonator or other resonant structures.

In various examples, components of a receiver may be implemented as one of, or a combination of, analog circuitry, digital circuitry, or one or more digital signal processors (DSP) or other microprocessors executing software instructions. Software instructions may include DSP instructions. Various aspects and functions described herein may be implemented as specialized hardware or software components executing in one or more computer systems.

Figure 8:
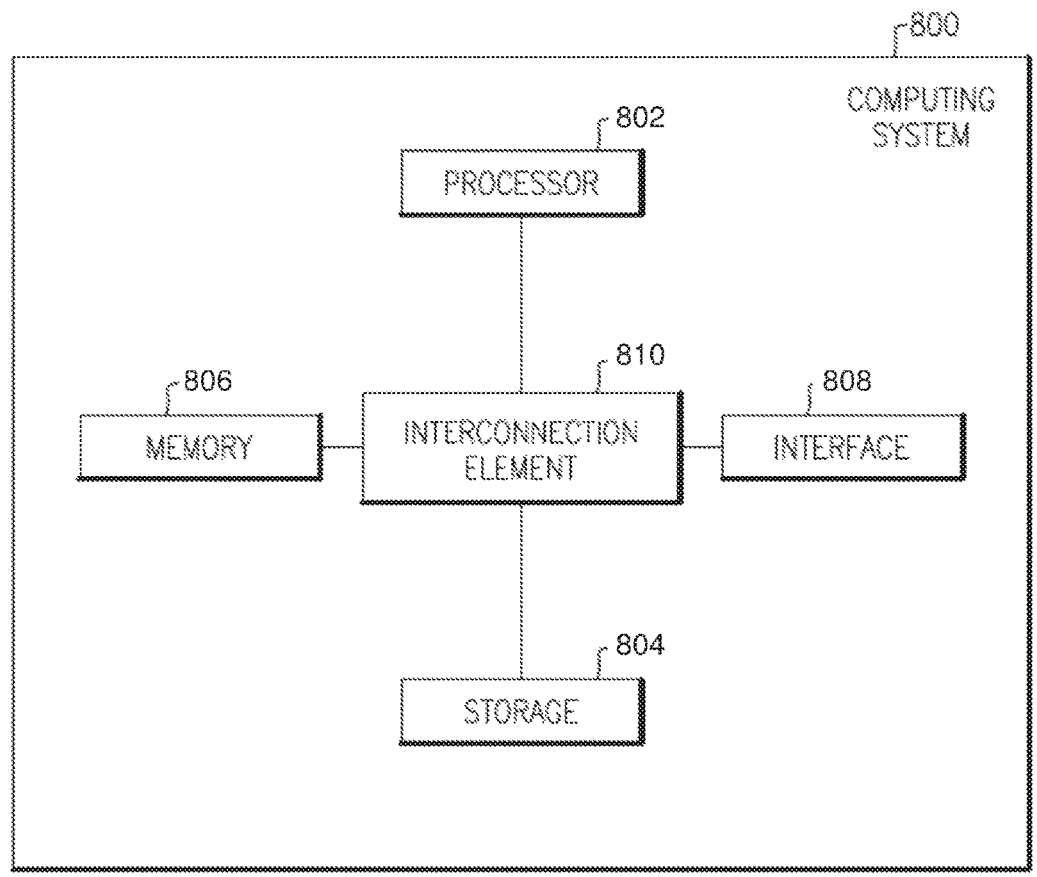
FIG. 8 is a functional block diagram of an example of a computing system that may be configured to implement various examples of the processes described herein.

FIG. 8 illustrates one example of a control circuit (e.g., a controller 800) that may implement software routines corresponding to various components of a receiver, such as the digital processing subsystem 250 of FIG. 2 and/or other components of a receiver 200. The controller 800 may include a processor 802, a data store 804, a memory 806, and one or more interfaces 808, such as a system interface and/or a user interface. While not explicitly illustrated in FIG. 8, in certain examples the controller 800 may be coupled to a power source. The power source may deliver power to one or more components of the controller 800, as well as other components of the optical transmitter 100 or optical receiver 200.

In FIG. 8, the processor 802 is coupled to the data storage 804, memory 806, and the various interfaces 808. The memory 806 stores programs (e.g., sequences of instructions coded to be executable by the processor 802) and data during operation of the controller 800. Thus, the memory 806 may be a relatively high performance, volatile, random access memory such as a dynamic random access memory ("DRAM") or static memory ("SRAM"). However, the memory 806 may include any device for storing data, such as a disk drive or other nonvolatile storage device. Various examples may organize the memory 806 into particularized and, in some cases, unique structures to perform the functions disclosed herein. These data structures may be sized and organized to store values for particular data and types of data.

The data storage 804 includes a computer readable and writeable data storage medium configured to store non-transitory instructions and other data, and can include non-volatile storage media, such as optical or magnetic disk, ROM or flash memory. The instructions may include executable programs or other code that can be executed by the at least one processor 802 to perform any of the functions described herein.

In various examples, the controller 800 includes several interface components 808, such as a system interface and/or a user interface. Each of the interface components 808 is configured to exchange, e.g., send or receive, data with other components of the controller 800 (and/or associated transmitter or receiver), or other devices in communication with the controller 800. According to various examples, the interface components 808 may include hardware components, software components, or a combination of hardware and software components.

In certain examples, components of the system interface couples the processor 802 to one or more other components of the optical receiver 200 shown in FIG. 2. The system interface may provide one or more control signals to any such components and may manage the operation of such components, as described above.

A user interface may include hardware and/or software components that allow a corresponding transmitter or receiver in which the controller 800 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the controller 800. Data received at the various interfaces may be provided to the processor 802, as illustrated in FIG. 8. Communication coupling (e.g., shown interconnection mechanism 810) between the processor 802, memory 806, data storage 804, and interface(s) 808 may be implemented as one or more physical busses in conformance with standard, proprietary, or specialized computing bus technologies.

The processor 802 performs a series of instructions that result in manipulated data that is stored in and retrieved from the data storage 804, as discussed above. In various examples, the series of instructions result in interpretation of the outputs from optical resonators as discussed above. Such instructions may correspond to commands for interpreting peaks and troughs of such output signals to determine phase, frequency, or amplitude changes (modulations) in an arriving optical signal, and/or recovering a data payload therefrom, as discussed herein.

The processor 802 may be any type of processor, multi-processor or controller, whether commercially available or specially manufactured. For instance, the processor may include a commercially available processor, such as a processor manufactured by INTEL, AMD, MOTOROLA, or FREESCALE. In some examples, the processor 802 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. An optical signal receiver comprising:
a first optical resonator configured to receive an arriving modulated optical signal, and to emit first output optical signal energy in response to receiving the arriving modulated optical signal, the arriving modulated optical signal having both a phase modulation and an amplitude modulation;
a second optical resonator configured to receive the arriving modulated optical signal, and to emit second output optical signal energy in response to receiving the arriving modulated optical signal; and
a detector configured to determine a phase transition in the arriving modulated optical signal based upon a transient peak of at least one of the first output optical signal energy and the second output optical signal energy, the phase transition corresponding to the phase modulation of the arriving modulated optical signal, and the detector being further configured to determine an amplitude transition in the arriving modulated optical signal based upon a steady-state settling intensity of at least one of the first output optical signal energy and the second output optical signal energy, the amplitude transition corresponding to the amplitude modulation of the arriving modulated optical signal.

2. The optical signal receiver of claim 1 wherein the detector is further configured to determine a magnitude and a direction of the phase transition, the direction of phase transition being determined by which of the first output optical signal energy or the second output optical signal energy exhibits a greater transient peak, and the magnitude of phase transition being determined based upon an amplitude of the greater transient peak.

3. The optical signal receiver of claim 1 wherein the first optical resonator is configured to produce a greater transient peak in the first output optical signal energy responsive to a positive phase transition in the arriving modulated optical signal than to a negative phase transition in the arriving modulated optical signal, and the second optical resonator is configured to produce a greater transient peak in the second output optical signal energy responsive to a negative phase transition in the arriving modulated optical signal than to a positive phase transition in the arriving modulated optical signal.

4. The optical signal receiver of claim 1 wherein each of the first and second optical resonators is an etalon having two semi-reflective surfaces configured to at least partially trap optical signal energy by reflecting a portion of optical signal energy impinging upon each of the semi-reflective surfaces.

5. The optical signal receiver of claim 1 further comprising a third optical resonator configured to receive the arriving modulated optical signal and to emit third output optical signal energy in response to receiving the arriving modulated optical signal, and the detector is configured to determine the phase transition based at least in part upon a comparison between at least two of the first output optical signal energy, the second output optical signal energy, and the third output optical signal energy.

6. The optical signal receiver of claim 4 wherein each of the first and second optical resonators has an optical dimension between their respective two semi-reflective surfaces, and the optical dimension of the first optical resonator differs from the optical dimension of the second optical resonator by a fraction of a wavelength.

7. A method of detecting information encoded in a modulated optical signal having both a phase modulation and an amplitude modulation, the method comprising:
  receiving a portion of the modulated optical signal at each of a plurality of optical resonators;
  accumulating optical signal energy in each of the plurality of optical resonators based at least in part on the received portion of the modulated optical signal;
  emitting an output optical signal from each of the plurality of optical resonators, each respective output optical signal being based at least in part on the accumulated optical signal energy in a respective one of the plurality of optical resonators;
  detecting variations in an intensity level of one or more of the output optical signals;
  determining a phase transition in the modulated optical signal based on a transient peak in the intensity level of the output optical signal from at least one of the plurality of optical resonators, the phase transition corresponding to the phase modulation of the modulated optical signal; and
  determining an amplitude transition in the modulated optical signal based on a steady-state settling intensity of the output optical signal from at least one of the plurality of optical resonators, the amplitude transition corresponding to the amplitude modulation of the modulated optical signal.

8. The method of claim 7 wherein determining the phase transition of the modulated optical signal includes determining a magnitude and a direction of the phase transition in the modulated optical signal.

9. The method of claim 7 wherein accumulating the optical signal energy in each of the plurality of optical resonators includes partially reflecting the optical signal energy between semi-reflective surfaces.

10. The method of claim 8 wherein determining the magnitude of the phase transition is based upon an intensity of the transient peak of one or more of the output optical signals.

11. The method of claim 10 wherein determining the direction of the phase transition is based on comparing the intensity of the transient peak of the output optical signals from at least two of the plurality of optical resonators.

12. An optical receiver comprising:
  a first resonator configured to at least partially accumulate optical signal energy, having an aperture to allow a portion of an optical signal to enter and an output to provide a first output signal, the first resonator configured to cause the first output signal to exhibit a first transient peak in response to a phase advance in the optical signal;
  a second resonator configured to at least partially accumulate optical signal energy, having an aperture to allow a portion of the optical signal to enter and an output to provide a second output signal, the second resonator configured to cause the second output signal to exhibit a second transient peak in response to a phase retreat in the optical signal; and
  a receiver configured to receive the first and second output signals and to determine a direction of a phase transition in the optical signal based upon comparing the first and second transient peaks, the receiver being further configured to determine an amplitude transition in the optical signal based upon at least one steady-state intensity value of at least one of the first and second output signals.

13. The optical receiver of claim 12 wherein each of the first and second resonators is an etalon having two semi-reflective surfaces configured to at least partially trap optical signal energy by reflecting a portion of optical signal energy impinging upon each of the semi-reflective surfaces.

14. The optical receiver of claim 12 wherein each of the first and second resonators is a micro-ring having an optical loop configured to at least partially trap optical signal energy.

15. The optical receiver of claim 12 wherein the first resonator has at least one dimension having a first value selected to allow the first resonator to resonantly accumulate the optical signal energy, wherein a corresponding at least one dimension of the second resonator has a second value selected to accumulate the optical signal energy in a non-resonant mode.

16. The optical receiver of claim 12 wherein the first resonator has a first dimension selected to accumulate the optical signal energy in a non-resonant mode, and the second resonator has a corresponding second dimension selected to accumulate the optical signal energy in a non-resonant mode, the first dimension being less than a resonant dimension and the second dimension being greater that the resonant dimension.

17. The optical receiver of claim 16 wherein the first dimension and the second dimension differ by a nominal amount that is a quarter of a wavelength or less.

\* \* \* \* \*